United States Patent [19]
Watanabe

[11] Patent Number: 5,912,989
[45] Date of Patent: Jun. 15, 1999

[54] PATTERN RECOGNITION WITH A TREE STRUCTURE USED FOR REFERENCE PATTERN FEATURE VECTORS OR FOR HMM

[75] Inventor: Takao Watanabe, Tokyo, Japan

[73] Assignee: NEC Corporation, Tokyo, Japan

[21] Appl. No.: 08/659,557

[22] Filed: Jun. 6, 1996

Related U.S. Application Data

[63] Continuation of application No. 08/253,748, Jun. 3, 1994, abandoned.

[30] Foreign Application Priority Data

Jun. 3, 1993 [JP] Japan .................................... 5-133049

[51] Int. Cl.$^6$ ........................................................ G06K 9/62
[52] U.S. Cl. ............................................ 382/228; 382/215
[58] Field of Search .................................... 382/224–228, 382/215

[56] References Cited

U.S. PATENT DOCUMENTS

| | | | |
|---|---|---|---|
| 4,282,403 | 8/1981 | Sakoe | 382/215 |
| 4,319,221 | 3/1982 | Sakoe | 382/215 |
| 5,060,278 | 10/1991 | Fukumizu | 382/227 |
| 5,060,282 | 10/1991 | Molley | 382/42 |
| 5,181,256 | 1/1993 | Kamiya | 382/215 |
| 5,276,766 | 1/1994 | Bahl et al. | 395/2.65 |
| 5,276,773 | 1/1994 | Knauer et al. | 395/27 |
| 5,325,445 | 6/1994 | Herbert | 382/225 |
| 5,329,596 | 7/1994 | Sakou et al. | 382/226 |

FOREIGN PATENT DOCUMENTS

| | | |
|---|---|---|
| 0 349 819 | 1/1990 | European Pat. Off. . |
| 0 523 347 | 1/1993 | European Pat. Off. .......... G10L 5/06 |
| 0 572 335 | 12/1993 | European Pat. Off. . |

OTHER PUBLICATIONS

Lalit R. Bahl et al., "A Maximum Likelihood Approach to Continuous Speech Recognition", IEEE Transaction on Pattern Analysis and Machine Intelligence, vol. PAMI–5, No. 2, Mar. 1983.

Nakagawa–Seiiti "Speech Recognition by Probability Models", Institute of Electronics, Information, and Communication Engineers of Japan, pp. 18–75, (1988).

Juliu T.Tou et al., "Pattern Recognition Principles", *Applied Mathematics and Computation*, pp. 94, 95, 290–293, (1974).

Enrico Bocchieri, "Vector Quantization For The Efficient Computation Of Continuous Density Likelihoods", pp. II–692–II–695, (1993).

*Primary Examiner*—Amelia Au
*Assistant Examiner*—Larry J. Prikockis
*Attorney, Agent, or Firm*—Foley & Lardner

[57] ABSTRACT

Preferably using frame vectors, a reference memory (13) keeps feature vectors of a set as a tree comprising a root node, leaf nodes farthest from the root node, and intermediate nodes with the frame vectors assigned respectively to the leaf nodes. A calculator (17) calculates cluster distances between each feature vector of an input pattern and a subset assigned among the set to each daughter node of a mother node which is first the root node. From the intermediate nodes with the mother node successively selected along each branch of the tree, a selector (19) selects at least one daughter node that gives a shortest possible cluster distance. Controlling the calculator and the selector to use the cluster distances starting at each node selected nearest to the root node and proceeding along the branches to one of the leaf nodes that are used as daughter nodes of mother nodes selected nearest to the leaf nodes, a pattern distance calculator (15, 23) calculates pattern distances between the input pattern and reference patterns represented by the set. If the branches do not reach such leaf nodes, the cluster distances are used to the mother node last selected. Frame distributions of HMM may be used instead of the frame vectors.

4 Claims, 3 Drawing Sheets

PATTERN RECOGNITION WITH A TREE STRUCTURE USED FOR REFERENCE PATTERN FEATURE VECTORS OR FOR HMM

This application is a continuation of application Ser. No. 08/253,748, filed Jun. 3, 1994, now abandoned.

BACKGROUND OF THE INVENTION

This invention relates to recognition of an input pattern which is typically representative of either discrete words or connected words. More particularly, this invention relates to a pattern recognition method and to a pattern recognition device.

Various discrete or connected word recognition devices are in practical use. Among such pattern recognition devices, representative are one using a dynamic programming (DP) algorithm and one in which continuous mixture density hidden Markov models (HMM) are used.

According to the dynamic programming algorithm, best match is located in accordance with the dynamic programming algorithm between an input pattern represented by a time sequence of input pattern feature vectors and a plurality of reference patterns, each represented by a stored sequence of reference pattern feature vectors. The best match is decided by finding a shortest one of pattern distances or a greatest one of pattern similarities between the input pattern and the reference patterns. On finding either the shortest pattern distance or the greatest pattern similarity, a time axis of the input pattern time sequence and each of similar axes of the reference pattern sequences are mapped each on another by a warping function. Details of the dynamic programming algorithm are described in the Japanese language (transliterated according to ISO 3602) by Nakagawa-Seiiti in a book entitled "Kakuritu Moderu ni yoru Onsei Ninsiki" (Speech Recognition by Probability Models) and published 1988 by the Institute of Electronics, Information, and Communication Engineers of Japan.

Briefly describing, the dynamic programming algorithm proceeds in principle as follows in the manner described on pages 18 to 20 of the Nakagawa book. An input pattern X and a reference pattern B are represented by:

$$X = x^1, x^2, \ldots, x^t, \ldots, x^T \quad (1)$$

and $$B = b^1, b^2, \ldots, b^j, \ldots, b^J, \quad (2)$$

where $x^t$ represents an input pattern feature vector at an input pattern time instant t, $b^j$ representing a reference pattern feature vector at a reference pattern time instant j, T representing an input pattern length, J representing a reference pattern length.

In general, such reference patterns have different reference pattern lengths. The input pattern length is different from the reference pattern lengths. In order to calculate the pattern distance between the input pattern and each reference pattern which is time sequentially used at consecutive reference pattern time instants, time correspondence must be established between the input and the reference pattern time instants. Each reference pattern time instant j is consequently related, for examples to an input pattern time instant j(t) by a warping or mapping function:

$$j = j(t).$$

Representing the pattern distance by D[X, B], a minimization problem is solved:

$$D[X, B] = \min_{j=j(t)} \sum_{t=1,T} d(t, j),$$

where d(t, d) represents a vector distance between the input and the reference pattern feature vectors $x^t$ and $b^j$. Usually, a Euclidean distance:

$$\|x^t - b^j\|^2 \quad (3)$$

is used as the vector distance.

The minimization problem is solved by calculating, under an initial condition:

$$g(1, 1) = d(1, 1),$$

a recurrence formula:

$$g(t, j) = d(t, j) + \min \begin{bmatrix} g(t-1, j) \\ g(t-1, j-1) \\ g(t-1, j-2) \end{bmatrix},$$

where g(t, j) is often called an accumulated distance. In the recurrence formula, the reference pattern time instant is consecutively varied from 1 up to J for each input pattern time instant which is consecutively varied from 1 up to T. The minimum distance is given by an ultimate cumulative distance g(T, J). Various other recurrence formulae and manners of calculating such a recurrence formula are known.

Each reference pattern represents a dictionary words a phoneme, a part of a syllables a concatenation of words, a concatenation of spoken letters or numerals, or the like. For each input pattern feature vector, the vector distances are calculated a number of times given by a two-factor product of (the number of reference patterns)×(the reference pattern lengths).

It is possible to compress the reference patterns and to reduce this number of times of calculation by vector quantization in the manner described in the Nakagawa book, pages 26 to 27. More particularly, similar reference pattern feature vectors are represented by a common representation at a certain reference pattern time instant. Several sequences of reference pattern feature vectors are thereby converted into a sequence of codes:

$$B = c^1, c^2, \ldots, c_j, \ldots, \text{and } c^J,$$

where $c^j$ represents a code book number given for the reference pattern feature vectors by a code book:

$$\{b(1), b(2), \ldots, b(k), b(K)\} \quad (4)$$

which is used to represent several reference pattern feature vectors approximately by a code book vector $b(c^j)$. When the vector quantization is resorted to, the number of times of calculation is only K times at each input pattern time instant t.

On the other hand, the hidden Markov models are described in the Nakagawa book, pages 40 to 46, 55 to 60, and 69 to 74 and are used to describe the reference patterns by introduction of a statistical idea in order to cope with various fluctuations in voice patterns. Parameters of the hidden Markov models are transition probability and output probability parameters. The transition probability parameters represent time sequential fluctuations of the voice patterns. The output probability parameters represent tone fluctuations of the voice patterns and are given by either a discrete probability distribution expression or a continuous probability distribution expression.

It is believed that the continuous probability distribution expression is superior to the discrete probability distribution expression. This is because the latter is adversely influenced by quantization errors. In the former, use is made of continuous mixture densities or distributions into which a plurality of element multi-dimensional Gaussian distributions are summed up with weights. It is possible to preliminarily calculate the transition and the output probability parameters by a forward-backward algorithm known in the art by using training data.

When the hidden Markov models are used, processes are as follows for recognition of the input pattern represented by Equation (1). It will be surmised that the output probability distribution expression is represented by the continuous mixture distributions. Denoting a transition probability by $a_{ji}$, where i and j represent states of the hidden Markov models, a weight for mixture by $\lambda_{im}$, where m represents an element number given to elements used in mixtures of the output probability distributions, and an average vector of each element Gaussian distribution by $\mu_{im}$, a forward probability $\alpha(i\ t)$ is calculated by a recurrence formula:

$$\alpha(i, t) = \sum_j \alpha(j, t-1) a_{ji} b_i(x^t),$$

for i=1, 2, ..., I and t=1, 2, ..., T, where I represents a final state. In the equation for the forward probability, a factor is given by:

$$b_i(x) = \sum_m \lambda_{im} N[x; \mu_{im}, \Sigma_{im}],$$

where $\Sigma_{im}$ represents a covariance matrix:

$$N[x; \mu_{im}, \Sigma_{im}] = (2\pi)^{-n/2} |\Sigma_{im}|^{-1/2} \times \exp[-(\mu_{im} - x)^t \Sigma^{-1} (\mu_{im} - x)/2], \quad (5)$$

n representing the dimension of the Gaussian distributions.

For the input pattern, an ultimate forward probability $\alpha(I, T)$ gives a pattern likelihood P(x). At each input pattern time instant, a frame likelihood is given by calculating $N[x; \mu_{im}, \Sigma_{im}]$ in accordance with Equation (5) a number of times given by a three-factor product of (the number of hidden Markov models)×(the number of states of each hidden Markov model)×(the number of mixtures).

In the manner described in the foregoing, an amount of calculation increases in a conventional pattern recognition device with the number of reference patterns and in their pattern length when the dynamic programming algorithm is used without the vector quantization. The amount of calculation increases with an increase in the number of quantization when the vector quantization is resorted to. The number of calculation increases also in a conventional pattern recognition device wherein the hidden Markov models are used when the number of states of the hidden Markov models and the number of mixtures are increased. Due to the increase in the amount of calculation in either case, the conventional pattern recognition device has been bulky and expensive. If the amount of calculation is suppressed to a low values the conventional pattern recognition device is not operable with satisfaction in its precision and accuracy.

SUMMARY OF THE INVENTION

It is consequently an object of the present invention to provide a pattern recognition method operable in accordance with either a dynamic programming algorithm or hidden Markov models with a reduced amount of calculation.

It is another object of this invention to provide a pattern recognition method which is of the type described and which gives high precision and accuracy.

It is a different object of this invention to provide a pattern recognition device capable of carrying out the pattern recognition method of the type described.

It is a further different object of this invention to provide a pattern recognition device which is of the type described and which is compact and of a reasonable price.

Other objects of this invention will become clear as the description proceeds.

In accordance with an aspect of this inventions there is provided a pattern recognition method which is for locating an input pattern among a plurality of reference patterns represented by a set of characteristic data and comprises the steps of: (A) representing the input pattern by a time sequence of input pattern feature vectors; (B) representing the set of characteristic data as a tree structure comprising a root node representing on a root stage the sets a plurality of leaf nodes representing individually the characteristic data or a leaf stage farthest from the root stages and a plurality of intermediate nodes representing subsets of the set on at least one intermediate stage between the root and the leaf stages, the subsets and the characteristic data represented by the leaf nodes being used as cluster data, respectively; (C) calculating cluster similarity measures between each input pattern feature vector and specific data represented among the cluster data by specified nodes specified among the intermediate and the leaf nodes on a single specified stage; (D) selecting at least one selected node among daughter nodes of a mother node, the selected node representing ones of the cluster data for which an extremum of the cluster similarity measures is calculated, the daughter nodes being on a stage next farther from the root stage than a stage of the mother node; (E) controlling the calculating step to specify the specified stage consecutively towards the leaf stage from a stage nearest to the root stage in the at least one intermediate stage with the specified nodes given first by the daughter nodes of the root node and subsequently by the daughter nodes of each of the at least one selected nodes (F) controlling the selecting step to select the selected node from the intermediate nodes; (G) calculating pattern similarity measures between the input pattern and the reference patterns with each pattern similarity measure calculated by using the cluster similarity measures along a path from each of the at least one selected node selected with said root node used as the mother node and along branches branched from the path to ones of the leaf nodes when these ones of leaf nodes are used as the daughter nodes of each of the at least one selected node selected ultimately in each branch from the intermediate nodes; and (H) locating the input pattern as one of the reference patterns for which an extremum of the pattern similarity measures is calculated.

Typically, the characteristic data are either reference pattern feature vectors for a dynamic programming algorithm or element distributions of continuous mixture density hidden Markov models. When the dynamic programming algorithm is resorted to, the cluster data are called cluster vectors. The cluster similarity measures are cluster distances. The specific data are specified vectors. The pattern similarity measures are pattern distances. The extremum is a shortest one. When the hidden Markov models are used, the cluster data are called cluster distributions. The cluster similarity measures are cluster likelihoods. The specific data are specified distributions. The pattern similarity measures are pattern likelihoods. The extremum is a greatest one.

In accordance with a different aspect of this invention, there is provided a pattern recognition device which is for locating an input pattern among a plurality of reference patterns represented by a set of reference pattern feature vectors and comprises: (A) an input pattern buffer for a time sequence of input pattern feature vectors representative of the input pattern; (B) reference pattern memory means for storing the reference pattern feature vectors in a tree structure comprising a root node representing on a root stage the set, a plurality of leaf nodes representing individually the reference pattern feature vectors on a leaf stage farthest from the root stage, and a plurality of intermediate nodes representing subsets of the set on at least one intermediate stage between the root and the leaf stages with the subsets and the reference pattern feature vectors represented by said leaf nodes used as cluster vectors respectively (C) cluster distance calculating means for calculating cluster distances between each input pattern feature vector and specified vectors represented among the cluster vectors by specified nodes specified among the intermediate and the leaf nodes on a single specified stage; (D) selecting means for selecting at least one selected node among daughter nodes of a mother node, the selected node representing ones of the cluster vectors for which a shortest one of the cluster distances is calculated the daughter nodes being on a stage next farther from the root stage than a stage of the mother node; (E) pattern distance calculating means for controlling the cluster distance calculating means and the selecting means to specify the specified stage consecutively towards the leaf stage from a stage nearest to the root stage in the at least one intermediate stage and to select the selected node from the intermediate nodes and for calculating pattern distances between the input pattern and the reference patterns with each pattern distance calculated by using the cluster distances along a path from each of the at least one selected node selected with the root node used as the mother node and along branches branched from the path to ones of the leaf nodes when these ones of leaf nodes are used as the daughter nodes of the at least one selected node selected ultimately in each branch from the intermediate nodes; and (F) locating means for locating the input pattern as one of the reference patterns for which a shortest one of the pattern distances is calculated.

In accordance with a further different aspect of this invention, there is provided a pattern recognition device which is for locating an input pattern among a plurality of reference patterns represented by a set of element distributions of continuous mixture density hidden Markov models and comprises: (A) an input pattern buffer for a time sequence of input pattern feature vectors representative of the input pattern; (B) reference pattern memory means for storing the element distributions in a tree structure comprising a root node representing on a root stage the set, a plurality of leaf nodes representing individually the element distributions on a leaf stage farthest from the root stage, and a plurality of intermediate nodes representing subset of the set on at least one intermediate stage between the root and the leaf stages, with the subsets and the element distributions represented by the leaf nodes used as cluster distributions; (C) cluster likelihood calculating means for calculating cluster likelihoods between each input pattern feature vector and specified distributions represented among the cluster distributions by specified nodes specified among the intermediate and the leaf nodes on a single specified stage; (D) selecting means for selecting at least one selected node among daughter nodes of a mother nodes the selected node representing ones of the cluster distributions for which a greatest one of the cluster likelihoods is calculated, the daughter nodes being on a stage next nearer to the leaf stage than a stage of the mother node; (E) pattern likelihood calculating means for controlling the cluster likelihood calculating means and the selecting means to specify the specified stage consecutively towards the leaf stage from a stage nearest to the root stage in the at least one intermediate stage with the specified nodes given first by the daughter nodes of the root node and subsequently by the daughter nodes of each of the at least one selected node and to select the selected node from the intermediate nodes and for calculating pattern likelihoods between the input pattern and the reference patterns with each pattern likelihood calculated by using the cluster likelihoods along a path from each of the at least one selected node selected with the root node used as the mother node and along branches branched from the path to ones of the leaf nodes when these ones of the leaf nodes are used as the daughter nodes of the at least one selected node selected ultimately in each branch from the intermediate nodes; and (F) locating means for locating the input pattern as one of the reference patterns for which a greatest one of the pattern likelihoods is calculated.

BRIEF DESCRIPTION OF THE DRAWING

FIG. 1, is another block diagram of the pattern recognition device of the type depicted in FIG. 1;

DESCRIPTION OF THE PREFERRED EMBODIMENTS

Figure 1:
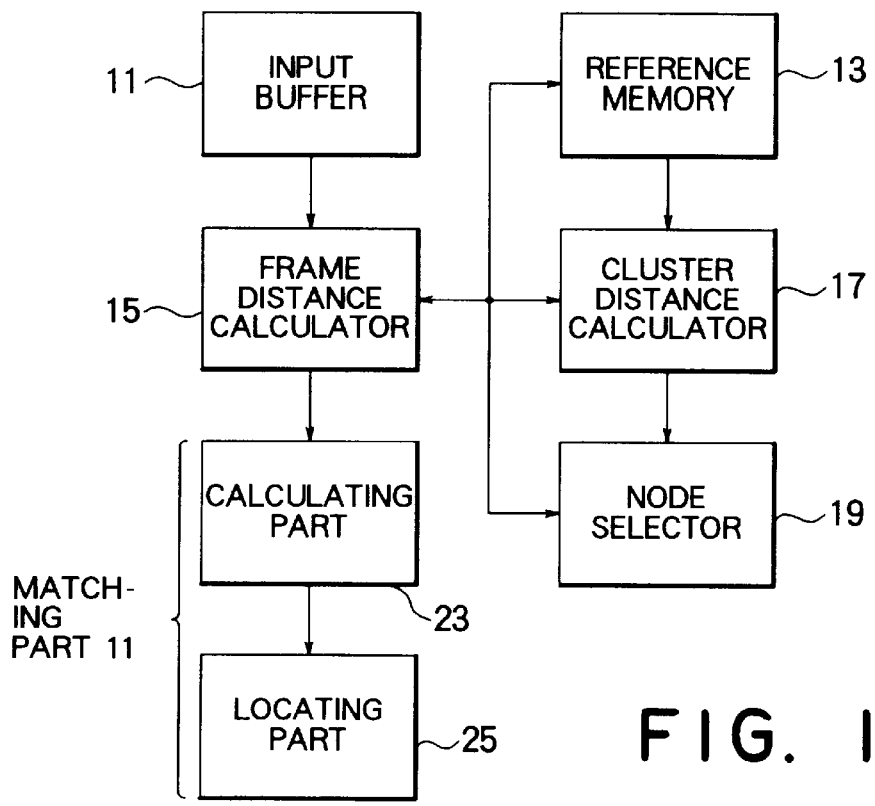
FIG. 1 is a block diagram of a pattern recognition device according to a first embodiment of the instant invention.

Referring to FIG. 1, the description will begin with a pattern recognition device according to a first embodiment of the present invention. In the manner described heretobefore, the pattern recognition device is for recognizing or locating an input pattern X among a plurality of reference patterns, which are either collectively or individually represented by a reference symbol B. The input pattern is represented by a time sequence of input pattern feature vectors $x^1, x^2, \ldots, x^t, \ldots$, and $x^T$ in the manner exemplified by Equation (1), where t represents an input pattern time instant. Each reference pattern is represented by a stored sequence of reference pattern feature vectors $b^1, b^2, \ldots, b^j, \ldots$, and $b^J$ as exemplified by Equation (2). The reference pattern feature vectors are time sequentially used for comparison with the time sequence of the input pattern with use of the warping or mapping function known in the art. Consequently, it is possible to understand that each reference pattern feature vector $b^j$ is used at a reference time instant j. In any event, the reference patterns are represented by a set of reference pattern feature vectors.

In FIG. 1, an input pattern buffer 11 is for the time sequence of input pattern feature vectors. The input pattern buffer 11 is used in the manner known in the art and is briefly called an input buffer. Like naming will be used throughout the description. The set of reference pattern feature vectors is preliminarily stored in a reference pattern memory 13.

Although the following descriptions are equally well applicable to the reference pattern feature vectors, it will be presumed for practical applications of the pattern recognition device that the set of reference pattern feature vectors is converted with reference to a code book of Expression (4) into a set of frame vectors b(1), b(2), . . . , b(k), . . . , and b(K), where k represents a vector quantization code number as a frame number and is used in place of the reference pattern time instant. Among suffixes to the frame vectors, K represents a final frame number which corresponds to the above-mentioned pattern length J.

When the frame vectors are used, a frame distance d(k) is typically calculated by a Euclidean distance:

$$\|x-b(k)\|^2,$$

where x is a simplified notation of each input pattern feature vector. This frame distance is used in place of the vector distance exemplified by Formula (3) and is used in the minimization problem described hereinabove.

Figure 2:
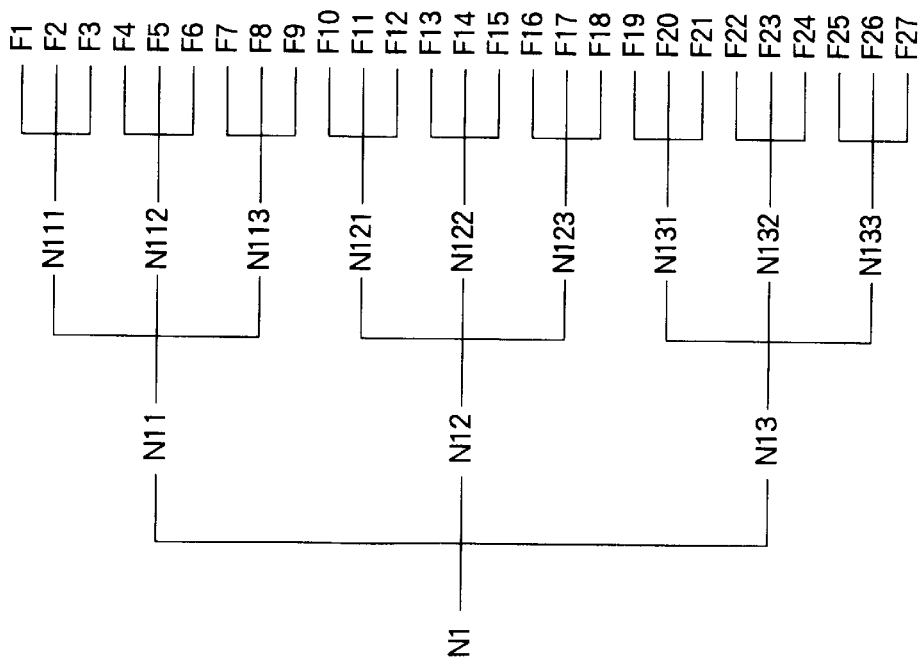
FIG. 2 exemplifies a tree structure for use in the pattern recognition device illustrated in FIG. 1.

Referring to FIG. 2 in addition to FIG. 1, a tree structure is for use in the reference memory 13 in storing the set of frame vectors. The tree structure comprises a root node N1 on a root stage to represent the set of frame vectors.

In the example being illustrated, first through twenty-seventh leaf nodes F1, F2, . . . , and F27 are on a leaf stage farthest from the root stage to individually represent the frame vectors. The tree structure is composed of such nodes arranged on first through fourth stages, among which the first through the fourth stages are the root and the leaf stages.

Furthermore, first through third primary intermediate nodes N11, N12, and N13 are on the second stage to represent first through third primary subsets of the set. First through ninth secondary intermediate nodes N111, N112, N113, N121, . . . , and N133 are on the third stage to represent secondary subsets of the first through the third primary subsets. In this manner, the tree structure comprises a plurality of intermediate nodes such as N11 and N111 on primary and secondary intermediate stages, namely, on at least one intermediate stages, between the root and the leaf stages.

As clusters, such subsets are represented by the intermediate nodes of the at least one intermediate stage. The intermediate nodes are given cluster vectors representative of the clusters. For the leaf nodes, the frame vectors serve as cluster vectors per se.

Connected to the input buffer 11, a frame distance calculator 15 successively reads the input pattern feature vectors and controls a cluster distance calculator 17 and a selected node selector 19. Controlled by the frame distance calculator 15, the cluster distance calculator 17 refers to the reference memory 13 to receive therefrom first the cluster vectors of one of the primary subsets, such as of the first primary subsets, and subsequently the cluster vectors of other primary subsets. In other words, the frame distance calculator 15 makes the cluster distance calculator 17 first use the root node N1 as a mother node and the first through the third primary intermediate nodes N11 to N13 as daughter nodes. In the tree structure, the daughter nodes are related to the mother node either by a branch or by a twig of the tree structure and are on a stage next farther from the root stage than a stage on which the mother node is.

It will be presumed at a certain time instant that the first primary intermediate node N11 is referred to. In this events the cluster distance calculator 17 calculates cluster distances between each input pattern feature vector and the cluster vectors of the first primary subset.

Controlled by the frame distance calculator 15 and supplied from the cluster distance calculator 17 with the cluster distances calculated relative to the cluster vectors of the first through the third primary subsets, the selected node selector 19 selects a prespecified number, such as two, of the daughter nodes as at least one selected node. When the predetermined number is equal to two, this at least one selected node consists of first and second selected nodes. Among the daughter nodes, the selected nodes represent ones of the cluster vectors that give shorter cluster distances. One of the daughter nodes is first selected, for which a shortest one of the cluster distances is calculated.

It will be assumed at a time instant that the first and the second primary intermediate nodes N11 and N12 are selected as the at least one selected node. Informed by the selected node selector 19 of such selected nodes, the frame distance calculator 15 specifies each of the first and the second primary intermediate nodes N11 and N12 afresh as the mother node. In consideration of branches of the tree structure, the first through the third secondary intermediate nodes N111 to N113 are used as the daughter nodes of the mother node N11. The fourth through the sixth secondary intermediate nodes N121 to N123 are the daughter nodes of the mother node N12.

In the manner described in the foregoing, the cluster distance calculator 17 calculates cluster distances relative to the cluster vectors of the secondary subsets of the first primary subset and later relative to the cluster vectors of the secondary subsets of the second primary subset. The selected node selector 19 selects at least one selected node at a time from the first through the third secondary intermediate nodes N111 to N113 and from the fourth through the sixth secondary intermediate nodes N121 to N123.

It will be assumed at this later time instant that the first and the second secondary intermediate nodes N111 and N112 are selected as the at least one selected node and that the fourth and the fifth secondary intermediate nodes N121 and N122 are selected. Each of these selected nodes N111 and N112 is used afresh as the mother node. The daughter nodes are now the first through the third leaf nodes F1 to F3 and the fourth through the sixth leaf nodes F4 to F6. When the fourth and the fifth secondary intermediate nodes N121 and N122 are used afresh as the mother nodes, their daughter nodes are the tenth through the twelfth leaf nodes F10 to F12 and are the thirteenth through the fifteenth leaf nodes F13 to F15.

As above, the cluster distance calculator 17 calculates cluster distances e(F1) through e(F6) relative to the cluster or the frame vectors represented by the first through the sixth leaf nodes F1 to F6 and cluster distances e(F10) through e(F15) relative to the cluster vectors represented by the tenth through the fifteenth leaf nodes F10 to F15. The cluster distance calculator 17 does not calculate such cluster distances relative to the cluster vectors represented by each unselected node, such as N13, which the selected node selector 19 does not select as the at least one selected node from or among the primary intermediate nodes. Nor does the cluster distance calculator 17 calculate the cluster distances relative to the cluster or the frame vectors represented by unselected nodes, such as N113, N123, F7 to F9, and F16 to F18, that are not selected as the at least one selected node from the intermediate nodes of additional intermediate stages and from the leaf nodes.

Controlling the cluster distance calculator 17 and the selected node selector 19 in this manner, the frame distance calculator 15 calculates the frame distance d(k)'s between each input pattern feature vector and the frame vectors b(k)'s as follows, where e(N11) and so forth represent the cluster distances calculated relative to the intermediate nodes N11 and so on.

$$d(1)=e(F1), d(2)=e(F2), d(3)=e(F3). d(4)=e(F4), d(5)=e(F5), d(6)=e(F6), d(7)=d(8)=d(9)=e(N11), d(10)=e(F10), d(11)=e(F11), d(12)=e(F12), d(13)=e(F13), d(14)=e(F14), d(15)=e(F15), \text{ and } d(16)=d(17)=d(18)=e(N12).$$

In the manner exemplified in the foregoing, the frame distance calculator 15 calculates the frame distances in accordance with distance calculating procedures for each input pattern feature vector as follows.

(A1) The root node is first used as the mother node.

(A2) Relative to the daughter nodes of such a mother node, the cluster distances are calculated.

(A3) With attention directed to the cluster distances calculated in the procedure (A2), a prespecified number of selected nodes are selected from or among the daughter nodes as at least one selected node, starting at one of the daughter nodes for or relative to which a shortest one of the cluster distance is calculated.

(A4) Using afresh as the mother node each of such selected nodes selected in the procedure (A3), the procedure returns to (A2). When the daughter nodes are the leaf nodes, the procedures (A2) and (A3) are not repeated.

(A5) The procedures (A2) through (A4) are repeated until the daughter nodes become all the leaf nodes.

(A6) Relative to each of the leaf nodes that is used as one of the daughter nodes, the cluster distance is used per se as the frame distances relative to the frame vector represented by the leaf node under consideration Relative to the frame vector for which no leaf nodes are used as the daughter nodes of the mother node other than the root nodes the frame distance is given by the cluster distance last calculated for one of the intermediate nodes that is last used as the selected node. None of the procedures (A3) through (A5) is carried out in connection with the primary intermediate node or nodes which are not selected in the procedure (A3).

Summarizing, the reference memory 13 is preliminarily loaded with the frame vectors in a tree structure. On a root stage, a root node N1 represents the set of frame vectors. On a leaf stage farthest from the root stages a plurality of leaf nodes, such as F1, individually represent the frame vectors of the set. On at least one intermediate stage between the root and the leaf stages, a plurality of intermediate nodes, such as N11 and N111, represent subsets of the set, respectively The at least one intermediate stage may comprise a primary stage and furthermore at least one additional stage. Such additional stage or stages may be called a secondary stage. Cluster vectors are given by the subsets and the leaf-stage frame vectors, respectively.

The cluster distance calculator 17 calculates cluster distances between each input pattern feature Vector and specified vectors represented among the cluster vectors by ones of the intermediate nodes that are specified on a single specified stage as specified nodes, such as N11 through N13. The specified stage and the specified nodes will presently be described.

The selected node selector 19 selects at least one selected node from daughter nodes of a mother node, which will shortly become clear. In any event, the daughter nodes are on a stage next farther from the root stage than another stage on which the mother node is present. In order to select such selected node or nodes, attention is directed to the cluster distances calculated relative to the cluster vectors represented by the daughter nodes. The selected nodes are selected to a prespecified number starting from one of the daughter nodes for which a shortest one of the last-mentioned cluster distances is calculated.

In order to calculate the frame distances between the frame vectors and the input pattern feature vector used in calculating the cluster distances, the frame distance calculator 15 controls the cluster distance calculator 17 to specify the specified stage consecutively towards the leaf stage from the primary stage, namely, a stage nearest to the root stage in the intermediate stage or stages. Specifying the specified stage, the frame distance calculator 15 makes the cluster distance calculator 17 use, as the specified nodes, first the daughter nodes N11 to N13 of the root node Ni and subsequently the daughter nodes N111 to N113 and N121 to N123 of each of the at least one selected node, such as N11 and N12. Furthermore, the frame distance calculator 15 controls the selected node selector 19 so as to select the selected node or nodes from the intermediate nodes.

In this manners the frame distance calculator 15 controls the cluster distance calculator 17 and the selected node selector 19 to deal with the procedures (A1) through (A6) and to produce the frame distances d(l) to d(K). The frame distance calculator 15 calculates each frame distance by using the cluster distances along a path from each of the at least one selected node N11 or N12 selected with the root node Ni used as the mother node and along branches branched from the path to ones, such as F1 to F3 or F4 to F6, of the leaf nodes when these ones of leaf nodes are used as the daughter nodes of the at least one selected node, such as now N111 and N112 or N121 and N122, selected ultimately in each branch from the intermediate nodes.

In FIG. 1, a matching part 21 calculates pattern distance between the input pattern and the reference patterns by solving the above-described minimization problem with use of the frame distances successively calculated by the frame distance calculator 15 typically between the time sequence of input pattern feature vectors and the set of frame vectors representative of the frame patterns. As a consequence, a calculating part 23 of the matching part 21 and the frame distance calculator 15 are operable collectively as a pattern distance calculating unit. When the frame difference calculator 15 is separated from the pattern distance calculator (15, 23) this part 23 may be called a calculating unit for calculating the pattern differences by using the frame distances.

A remaining part of the matching part 21 serves as a locating part 25 for locating the input pattern among the reference patterns by finding the best match between the time sequence and the stored sequences of reference pattern feature vectors which are used as the set of frame vectors. The remaining part 25 consequently serves as a locating unit for locating the input pattern as one of the reference patterns that minimizes the pattern distances.

Figure 3:
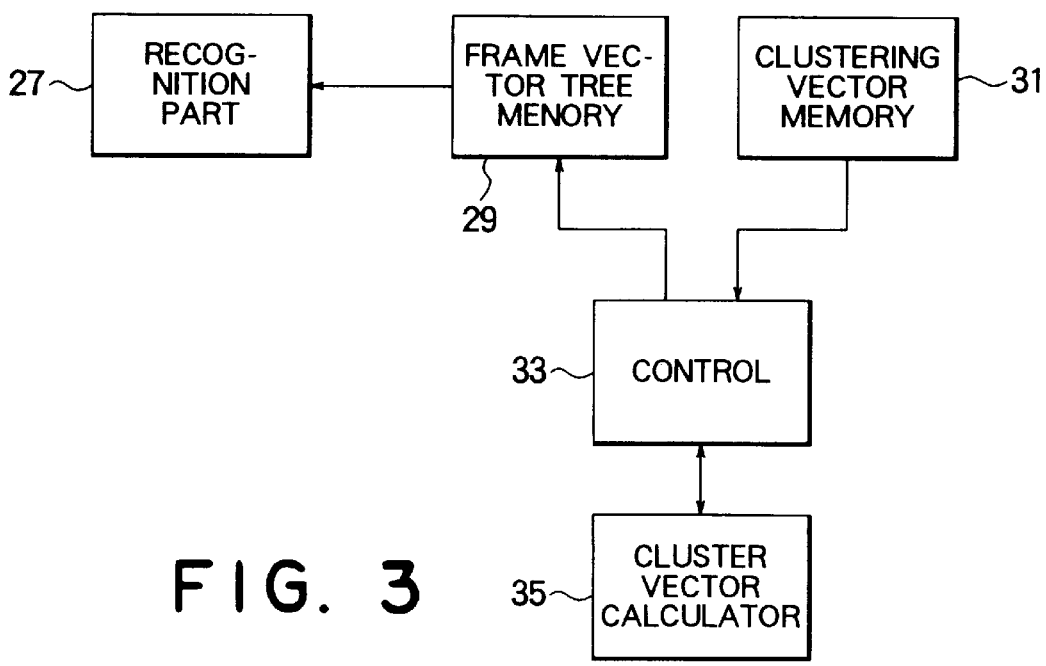
FIG. 3, depicted below

Turning to FIG. 3 with FIGS. 1 and 2 continuously referred to, it is possible to understand the pattern recognition device of FIG. 1 as follows. A recognition part 27 corresponds to a combination of the input buffer 11 the frame distance calculator 15, the cluster distance calculator 17, the selected node selector 19, and the matching part 21. Preliminarily before start of operation of the recognition part 27, a frame vector tree memory 29 of the reference memory 13 is loaded with the tree structure of the set of frame vectors.

To this ends a clustering vector memory 31 is preliminarily loaded with the frame vectors of the set as lustering vectors. A controller 33 successively reads from the clustering vector memory 31 the clustering vector as read vectors and makes a cluster vector calculator or processor 35 execute clustering procedures as follows.

(A11) All frame vectors are used as a set of clustering vectors.

(A12) In the manner which will later be described, the set of clustering vectors is divided into a plurality of clusters. A representative vector of each cluster is used as a cluster vector described above.

(A13) In connection with each cluster obtained in the procedure (A12), the frame vectors of the cluster under consideration are used as clustering vector of a subset for repetition of the procedure (A12).

(A14) The procedures (A12) and (A13) are repeated a specified number of times.

Division of the clustering vectors of either the set or each subset is possible, for example, in accordance with the K-means algorithm described by Julius T. Tou and Rafael C. Gonzalez in a book which is entitled "Pattern Recognition Principles" and published 1974 by Addison-Wesley Publishing Company. This Tou et al book is No. 7 of Applied Mathematics and Computation edited by Robert Kalava. The procedures will be described later in the following.

Figure 4:
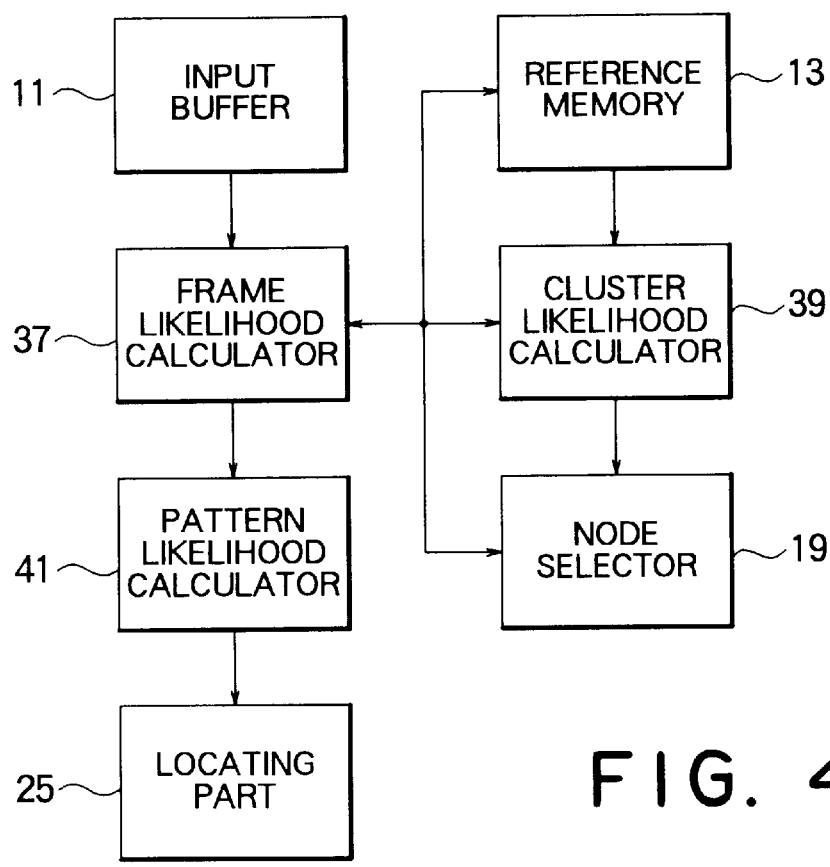
FIG. 4 is a block diagram of a pattern recognition device according to a second embodiment of this invention.

Referring now to FIG. 4 with FIG. 2 again referred to, the description will proceed to a pattern recognition device according to a second embodiment of this invention. Like the pattern recognition device illustrated with reference to FIGS. 1 and 2, the pattern recognition device of FIG. 4 is for locating an input pattern X exemplified by Equation (1) among reference patterns B of the type described.

It should be noted that the reference patterns are represented by a set of element distributions of continuous mixture density or distribution hidden Markov models described heretobefore. As described, the continuous mixture distributions are derived from a plurality of multi-dimensional or N-dimensional element Gaussian distributions where N represents the number of dimensions. The code book of Equation (4) will again be used in converting a set of element distributions into a set of frame distributions of the frame number k variable between 1 and the final frame number K.

In place of the minimization problem described hereinabove and used in operation of the matching part 21 described in conjunction with FIG. 1, a maximization problem is used wherein the minimum is changed to a maximum. In the maximization problem, likelihoods are substituted for the distances. Frame likelihoods $p(1), p(2), \ldots, p(k), \ldots$, and $p(K)$ are therefore calculated between each input pattern feature vector and the frame distributions in accordance with:

$$p(k)=N[x; \mu_k, \Sigma_k],$$

where $\mu_k$ represents a mean vectors $\Sigma_k$ representing a covariance matrix. This algorithm is described and discussed in an article contributed by Enrico Bocchieri to the Proceedings of ICASSP, 1993, under the title of "Vector Quantization for the Efficient Computation of Continuous Density Likelihoods" on pages II-692 to II-695.

In FIG. 4, the pattern recognition device comprises an input buffer 11 which is not different from that described in connection with FIG. 1. A reference memory 13 is similar to that of FIG. 1 The reference memory 13 is, however, preliminarily loaded with the set of frame distributions in a tree structure exemplified with reference to FIG. 2. The nodes N11 to N13, N111 to N133, and F1 to F27 represent the frame distributions. The subsets and the frame distributions represented by the leaf nodes F1 to F27 are called cluster distributions.

Connected to the input buffer 11 depicted in FIG. 4, a frame likelihood calculator 37 controls a cluster likelihood calculator 39 and a selected node selector which is very similar to the selected node selector 19 of FIG. 1 and is consequently designated by the reference numeral 19. Controlled by the frame likelihood calculator 37, the cluster likelihood calculator 39 refers to the reference memory 13 to receive therefrom first the cluster distribution of one of the primary subsets, such as the first primary subset represented by the first primary intermediate node N11, and subsequently the cluster distributions of other primary subsets represented by other primary intermediate nodes, such as N12 and N13. In other words, the frame likelihood calculator 37 makes the cluster likelihood calculator 39 first use the root node N1 as a mother node and the primary intermediate nodes N11 through N13 as daughter nodes.

It will be presumed at a certain time instant that the first primary intermediate node N11 is referred to. In this events the cluster likelihood calculator 39 calculates cluster likelihoods between each input feature vector and the cluster distributions of the first primary subset.

Controlled by the frame likelihood calculator 37 and supplied from the cluster likelihood calculator 39 with the cluster likelihoods relative to the cluster distributions of the primary subsets, the selected node selector 19 selects a prespecified number, such as two, of the daughter nodes N11 to N13 as at least one selected node. When the prespecified number is equal to twos this at least one selected node consists of first and second selected nodes. Among the daughter nodes, the selected nodes represent ones of the cluster likelihoods that now give greater cluster likelihoods. One of the daughter nodes is first selected, for which a greatest one of the cluster likelihoods is calculated.

It will be assumed that the first and the second primary intermediate nodes N11 and N12 are selected as the at least one selected node in connection with the root node N1 Informed by the selected node selector 19 of such selected nodes the frame likelihood calculator 37 specifies each of the first and the second primary intermediate nodes N11 and N12 afresh as the mother node. In consideration of the tree structure, the first through the third secondary intermediate nodes N111 to N113 are used as the daughter nodes of the mother node N11. The fourth through the sixth secondary intermediate nodes N121 to N123 are the daughter nodes of the mother node N12.

In the manner described in the foregoing, the cluster likelihood calculator 39 later calculates cluster likelihoods relative to the cluster distributions of the secondary subsets. The selected node selector 19 selects at least one selected node from the first through the third secondary intermediate nodes N111 to N123 and from the fourth through the sixth secondary intermediate nodes N121 to N123.

It will be assumed at this later time instant that the first and the second secondary intermediate nodes N111 and N112 are selected as the at least one selected node and that the fourth and the fifth secondary intermediate nodes N121 and N122 are selected. Each of these selected nodes N111 and N112 is used afresh as the mother node. The daughter nodes are now the first through the third leaf nodes F1 to F3 and the fourth through the sixth leaf nodes F4 to F6. When the fourth and the fifth secondary intermediate nodes N121 and N122 are used afresh as the mother nodes, their daughter nodes are the tenth through the fifteenth leaf nodes F10 to F15.

As before, the cluster likelihood calculator 39 calculates cluster likelihoods e(F1) through e(F6) relative to the clusters or the frame distributions represented by the first through the sixth leaf nodes F1 to F6 and cluster likelihoods e(F10) through e(F15) relative to the cluster distributions represented by the tenth through the fifteenth leaf nodes F10 to F15. The cluster likelihood calculator 39 does not calculate such cluster likelihoods relative to the cluster distributions represented by each unselected node, such as N13, which the selected node selector 19 does not select as the at least one selected node from the daughter nodes, such as N11 to N13, of the root node N1. Nor does the cluster likelihood calculator 39 calculate the cluster likelihoods relative to the clusters or the frame distributions represented by unselected nodes, such as N113, N123, F7 to F9, and F16 to F18, that are not selected as the at least one selected node from the intermediate nodes of the secondary stage and from the leaf nodes.

Controlling the cluster likelihood calculator 39 and the selected node selector 19 in this manners the frame likelihood calculator 37 calculates the frame likelihoods p(k)'s in the manner described above in connection with the frame distances d(k)'s. The frame likelihoods are consequently calculated in accordance with likelihood calculating procedures for each input pattern feature vector as follows.

(B1) The root node is first used as the mother node.
(B2) Relative to the daughter nodes of such a mother node, the cluster likelihoods are calculated
(B3) With attention directed to the cluster likelihoods calculated in the procedure (B2), a prespecified number of selected nodes are selected from the daughter nodes as at least one selected node, starting at one of the daughter nodes for which a greatest one of the cluster likelihoods is calculated.
(B4) With each of such selected node used afresh as the mother node, the procedure returns to (B2) from (B3). When the daughter nodes are the leaf nodes, the procedures (B2) and (B3) are no more repeated.
(B5) The procedures (B2) through (B4) are repeated until the daughter nodes become all the leaf nodes.
(B6) Relative to each of the leaf nodes that is used as one of the daughter nodes the cluster likelihood is used per se as the frame likelihood relative to the frame distribution represented by the leaf node under consideration Relative to the frame distributions for which the leaf nodes are not used as the daughter nodes of the mother node other than the root node, the frame likelihood is given by the cluster likelihood last calculated for one of the intermediate nodes that is last used as the selected node. None of the procedures (B3) through (B5) is carried out in connection with the primary intermediate node or nodes which are not selected in the procedure (B3).

In summary, the reference memory 13 is preliminarily loaded with element distributions of a set representative of the continuous mixture density hidden Markov models which represent, in turn, a plurality of ,reference patterns The element distributions are typically the frame distributions described above.

On a root stage of the tree structure, a root node N1 represents the set of element distributions On a leaf stage farthest from the root stage, a plurality of leaf nodes, such as F1, individually represent the element distributions of the set. On at least one intermediate stage between the root and the leaf stages, a plurality of intermediate nodes, such as N11 and N111, represent subsets of the set, respectively. The at least one intermediate stage may comprise a primary stage and furthermore at least one additional stage. Such additional stage or stages may be called a secondary stage. Cluster distributions are given by the subsets and the leaf-stage element distributions, respectively.

The cluster likelihood calculator 39 calculates cluster likelihoods between each input pattern feature vector and specified distributions represented among the cluster distributions by ones of the intermediate nodes that are specified on a single specified stage as specified nodes, such as N11 through N13. The specified stage and the specified nodes will presently be described.

The selected node selector 19 selects at least one selected node from daughter nodes of a mother node, which is shortly become clear. In any event, the daughter nodes are on a stage next farther from the root stage than another stage on which the mother node is present. In order to select such selected node or nodes, attention is directed to the cluster likelihoods calculated relative to the cluster distributions represented by the daughter nodes. The selected nodes are selected to a prespecified number starting from one of the daughter nodes for which a greatest one of the last-mentioned cluster likelihoods is calculated.

In order to calculate the frame likelihoods between the frame distributions and the input feature vector used in calculating the cluster likelihoods, the frame likelihood calculator 37 controls the cluster likelihood calculator 39 to specify the specified stage consecutively towards the leaf stage from the primary stage, namely, a stage nearest to the root stage in the intermediate stage or stages. Specifying the specified stage, the frame likelihood calculator 37 makes the cluster likelihood calculator 39 use, as the specified nodes, first the daughter nodes N11 to N13 of the root node N1 and subsequently the daughter nodes N111 to N113 and N121 to N123 of each of the at least one selected node, such as N11 and N12. Furthermore, the frame likelihood calculator 37 controls the selected node selector 19 so as to select the selected node or nodes from the intermediate nodes.

In this manner, the frame likelihood calculator 37 controls the cluster likelihood calculator 39 and the selected node selector 19 to deal with the procedures (B1) through (B6) and to produce the frame distributions b(1) to b(K). The frame likelihood calculator 37 calculates each frame likelihood by using the cluster likelihoods along a path from each of the at least one selected node N11 or N12 selected with the root node N1 used as the mother node and along branches branched from the path to ones, such as F1 to F3 or F4 to F6, of the leaf nodes when these ones of the leaf nodes are used as the daughter nodes of the at least one selected node, such as now N111 and N112 or N121 and N122, selected ultimately in each branch from the intermediate nodes.

In FIG. 4, the matching unit 21 of FIG. 1 is illustrated in a different manner. More particularly, a pattern likelihood calculator 41 calculates pattern likelihoods between the input pattern and the reference patterns by solving the above-described maximization problem with one of the frame likelihoods successively calculated between the time sequence of the input pattern feature vectors and the set of frame distributions representative of the reference patterns. Serving as the remaining part 25 described in conjunction with FIG. 1 among the matching part 21, a locating unit is denoted by the reference numeral 25. Finding the best match between the input pattern among the reference patterns, the locating unit 25 locates the input pattern as one of the reference patterns that maximizes the pattern likelihoods.

Figure 5:
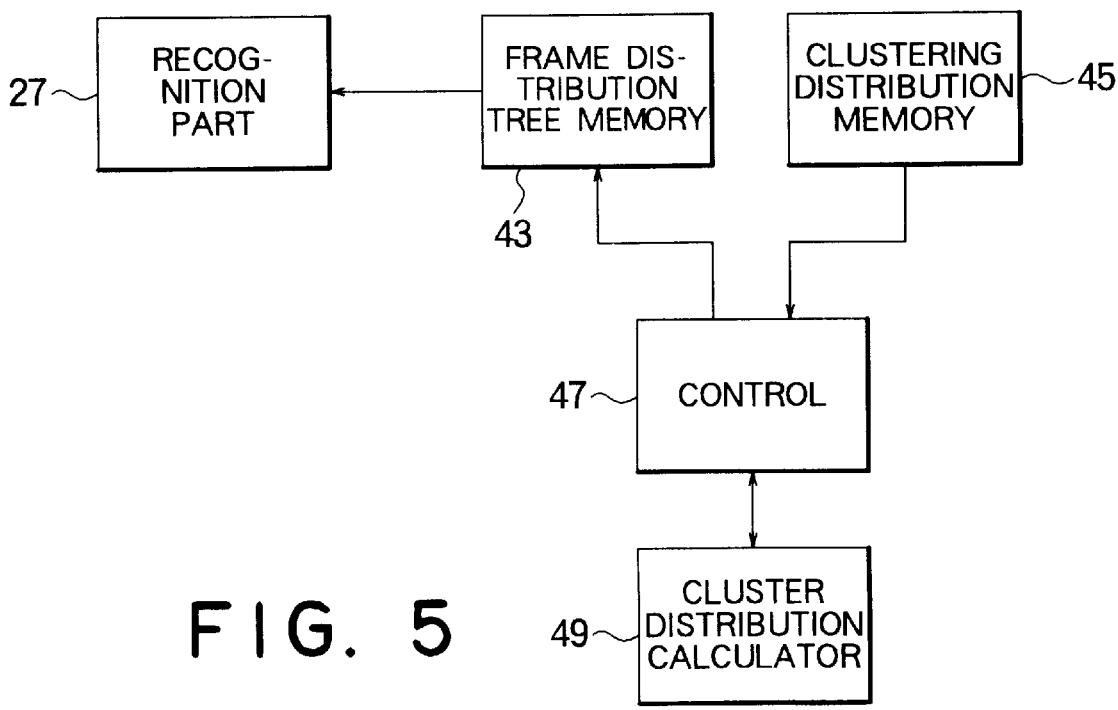
FIG. 5 is another block diagram of the pattern recognition device illustrated in FIG. 5.

Turning to FIG. 5 with FIGS. 2 and 4 continuously referred to, it is possible to understand the pattern recognition device of FIG. 4 as follows. A recognition part corresponds to that described in connection with FIG. 3 and is therefore designated by the reference numeral 27. More specifically, this recognition part 27 serves as a combination of the input buffer 11, the frame likelihood calculator 37, the cluster distance calculator 39, the selected node selector 19, the pattern likelihood calculator 41, and the locating unit 25. Preliminarily before start of operation of the recognition part 27, a frame distribution tree memory 43 of the reference memory 13 is located with the tree structure of the set of element or frame distributions.

For this purpose, a clustering distribution memory 45 is preliminarily loaded with the frame distributions or element distributions of the set as clustering distributions $N_j[x]$, where j represents a j-th element distribution and is variable between 1 and J, both inclusive. The set of element distributions corresponds to the reference patterns B. The indexes 1 to J of the reference pattern feature vectors are consequently used herein to identify the element distributions $N_j[x]$.

A controller 47 successively reads from the clustering distribution memory 45 the clustering distributions as read distributions and makes a cluster distribution calculator or processor 49 execute clustering procedures as follows.

(B11) All element distributions are used as a set of clustering distributions.
(B12) In the manner which will presently be described the set of clustering distributions is divided into a plurality of clusters. A representative vector of each cluster is used as a cluster distribution.
(B13) In connection with each cluster obtained in the procedure (B12), the frame distributions of the cluster under consideration are used as clustering distribution subset for repetition of the procedure (B12).
(B14) The procedures (B12) and (B13) are repeated a specified number of times.

Division of the clustering distribution of either the set or each subset is possible in the manner of division of the clustering vectors. The above-mentioned K-means algorithm is described in the book of Tou et al, pages 94 to 95. In the followings this algorithm will be carried out by using the Kullback divergence exemplified in the Tou et al books pages 292 to 293.

Figure 6:
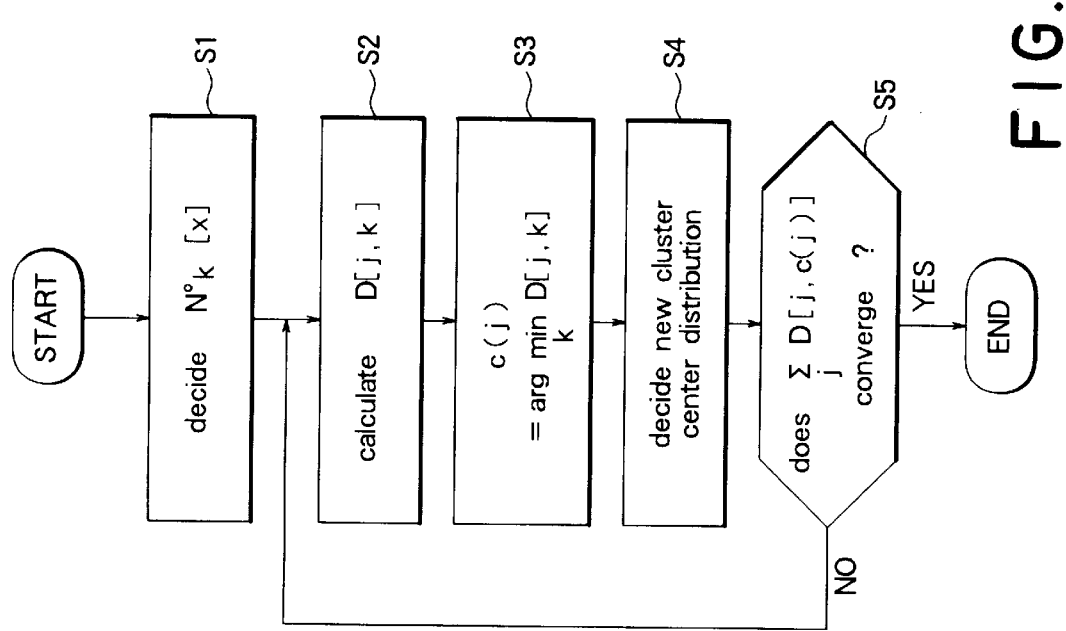
FIG. 6, drawn to the right of FIG. 2, shows a flow chart for use in describing operation of the pattern recognition device illustrated in FIG. 5.

Further turning to FIG. 6 with FIGS. 2, 4, and 5 additionally referred to, the cluster distribution calculator 49 is operable in the manner described hereunder. After start of operations an initial cluster center distribution is arbitrarily decided at a first step S1. This distribution consists of first through K-th initial cluster centers $N^0_1[x]$, $N^0_2[x]$, ... , $N^0_k[x]$, ... , and $N^0_K$ x. In connection with such cluster centers, k represents a cluster number and will be used to furthermore identify a k-th cluster.

Next at a second step S2, distances D[j, k] are calculated between the initial cluster center distribution and the element distributions preliminarily stored in the clustering distribution memory 45. These distances are calculated by using the Kullback divergence as follows.

$$D[j, k] = \int (N_j[x] - N^0_k[x]) \times (\log N_j[x] - \log N^0_k[x]) dx,$$

which corresponds to Equation (7.8–9) of Tou et al. It is readily possible to calculate the Kullback divergence from a mean value of the Gaussian distributions and a value of the covariance matrix. The distance therefore depends on the cluster number.

At a third step S3, a distribution code c(j) is decided by deciding therefor the cluster number which minimizes the distance for each element distribution. That is:

$$c(j) = \arg \min_k D[j, k].$$

At a fourth step S4, a new cluster center distribution is decided by a distribution mean of element distributions belonging to each previously decided cluster center distribution. In order to describe the new cluster center distribution, an i-th element of the distribution mean of the cluster centers of the cluster k will be designated by $\mu_i(k)$. Similarly, an i-th element of the distribution mean of the element distributions will be denoted by $\mu_i(j)$. Furthermore, an i-th element of divergences of the element distributions will be represented by $\sigma_i^2(j)$. When the new cluster center distribution has a covariance given by a diagonal matrix:

$$\Sigma(k) = \begin{bmatrix} \sigma_1^2(k) & & & 0 \\ & \sigma_2^2(k) & & \\ & & \ddots & \\ 0 & & & \sigma_n^2(k) \end{bmatrix},$$

the i-th element and an i-th element of the covariance matrix are given for the new cluster center distribution by:

$$\mu_i(k) = (1/J(k)) \Sigma j \, \mu_i(j)$$

and $$\sigma_i^2(k) = (1/J(k)) \Sigma \sigma_i^2(j) + (1/J(k)) \Sigma \mu_i^2(j) - \mu_i^2(k),$$

where J(k) represents the number of element distributions belonging to the cluster k. This i-th element serves as an i-th element of the divergence of the cluster centers.

In order to proceed with the K-means algorithm, a condition equation is introduced as described in the following. At a fifth step S5, check is carried out whether or not the clustering procedures result in convergence of the condition equation. If this equation converges, the clustering procedure comes to an end. Otherwise, the procedures are again followed from the second step S2 until the clustering procedures result in convergence. The condition equation is:

$$\overline{D} = \sum_j D[j, c(j)].$$

Turning back to FIGS. 4 and 5, the controller 47 makes the cluster distribution calculator 49 execute the clustering operation of the procedures (B11) to (B13) until the procedure (B14) results in convergence of the condition equation. When the convergence is reached, the controller 47 stores a result of the clustering operation in the frame distribution tree memory 43. In FIG. 4, the reference memory 13 is loaded with the set of frame distribution. In FIGS. 1 and 3, the set of frame vectors is similarly stored in the frame vector tree memory 29 and consequently in the reference memory 13.

Reviewing FIGS. 1 through 6, it will now be possible for one skilled in the art to make and use the pattern recognition device of this invention. In FIG. 2 the nodes N11 through N133 may represent subsets of the reference pattern feature vectors with the leaf nodes F1 to F27 made to represent the respective reference pattern feature vectors as they stand. In such an event, the primary subsets represent individual reference patterns. The number of stages may or may not differ from a primary subset to another primary subset. The number of daughter nodes of each mother node may depend on the circumstances. In the (A3) procedure, the prespecified number is specified in consideration of a speed which is desired in recognizing the input pattern. In the (A5) procedure, the number of repetitions of the (A2) through the (A4) procedures may depend on the primary subsets. In the (A12) procedure, the representative vector may either be an average vector of the frame vectors belonging to each cluster or be one of the frame vectors that is nearest to the average vector. In the (A14) procedures it is possible to empirically determine the specified number of times.

While this invention has thus far been described in specific conjunction with two preferred embodiments thereof, it will now be readily possible for one skilled in the art to put this invention into practice in various other manners. Above all, it is possible to implement in FIGS. 1 and 3 a combination of the frame distance calculator 15, the cluster distance calculator 17, the selected node selector 19; the matching part 21, the controller 33, and the cluster vector calculator 35 by a microprocessor. In FIGS. 4 and 5; a microprocessor is operable as a like combination. It is possible to substitute a neural network for such a microprocessor.

What is claimed is:

1. A pattern recognition device for locating an input pattern among a plurality of reference patterns represented by a set of reference pattern feature vectors, comprising:

an input pattern buffer for receiving a time sequence of input pattern feature vectors representative of said input pattern;

reference pattern memory means for storing said reference pattern feature vectors in a tree structure including a root node which is located on a root stage and which represents said set of reference pattern feature vectors, a plurality of leaf nodes each representing a corresponding one of said reference pattern feature vectors and located on a leaf stage farthest from said root stage, and a plurality of intermediate nodes representing subsets of said set of reference pattern feature vectors and located on at least one intermediate stage between said root stage and said leaf stage, with said subsets of reference pattern feature vectors represented by said intermediate nodes and the reference pattern feature vectors represented by said leaf nodes being denoted as cluster vectors, wherein cluster vectors are associated with each node except said root node and include feature vectors corresponding to all leaf nodes descending from a non-leaf node;

means for specifying a single specified stage, said single specified stage containing daughter nodes of a mother node, said mother node being located on a stage closer to said root stage than said single specified stage;

distance calculating means for calculating vector distances between each input pattern feature vector and said cluster vectors on said single specified stage, said single specified stage corresponding to one of said at least one intermediate stage and said leaf stage;

selecting means for selecting at least one node among said daughter nodes of said mother node, said at least one selected node representing ones of said cluster vectors for which a shortest one of said vector distances is calculated, said daughter nodes being located on a stage next farther from said root stage than a stage on which said mother node is located;

pattern distance calculating means for controlling said distance calculating means and said selecting means to specify another stage consecutively towards said leaf stage from a stage nearest to said root stage in said at least one intermediate stage with said specified nodes given first by said daughter nodes of said root node and subsequently by said daughter nodes of each of said at least one selected node, to select another node from said intermediate nodes, and for calculating pattern distances between said input pattern and said reference patterns with each pattern distance calculated by using said vector distances alone a path from each of said at least one node selected by said selecting means with said root node used as said mother node and along branches branched from said path to ones of said leaf nodes when said ones of said leaf nodes are used as said daughter nodes of said at least one selected node selected ultimately in each branch from said intermediate nodes; and locating means for locating said input pattern as one of said reference Patterns for which a shortest one of said pattern distances is calculated, wherein said pattern distance calculating means comprises:

frame distance calculating means for controlling said distance calculating means and said selecting means to specify said specified stage consecutively towards said leaf stage from the stage nearest to said root stage in said at least one intermediate stage with said specified nodes given first by the daughter nodes of said root node and subsequently by the daughter nodes of each of said at least one selected node selected with said root node used as the mother node and to select said selected node from said intermediate nodes and for calculating frame distances between each input pattern feature vector and said cluster vectors with said vector distances used along a path from each of said at least one selected node selected with said root node used as the mother node and along branches branched from said path to ones of said leaf nodes when said ones of said leaf nodes are used as the daughter nodes of said at least one selected node selected ultimately in each branch from said intermediate nodes; and calculating means for calculating said pattern distances by using said frame distances.

2. A pattern recognition device for locating an input pattern among a plurality of reference patterns represented by a set of reference pattern feature vectors, comprising:

an input pattern buffer for receiving a time sequence of input pattern feature vectors representative of said input pattern;

reference pattern memory means for storing said reference pattern feature vectors in a tree structure including a root node which is located on a root stage and which represents said set of reference pattern feature vectors, a plurality of leaf nodes each representing a corresponding one of said reference pattern feature vectors and located on a leaf stage farthest from said root stage, and a plurality of intermediate nodes representing subsets of said set of reference pattern feature vectors and located on at least one intermediate stage between said root stage and said leaf stage, with said subsets of reference pattern feature vectors represented by said intermediate nodes and the reference pattern feature vectors represented by said leaf nodes being denoted as cluster vectors, wherein cluster vectors are associated with each node except said root node and include feature vectors corresponding to all leaf nodes descending from a non-leaf node;

means for specifying a single specified stage, said single specified stage containing daughter nodes of a mother node, said mother node being located on a stage closer to said root stage than said single specified stage;

distance calculating means for calculating vector distances between each input pattern feature vector and said cluster vectors on said single specified stage, said single specified stage corresponding to one of said at least one intermediate stage and said leaf stage;

selecting means for selecting at least one node among said daughter nodes of said mother node, said at least one selected node representing ones of said cluster vectors for which a shortest one of said vector distances is calculated, said daughter nodes being located on a stage next farther from said root stage than a stage on which said mother node is located;

pattern distance calculating means for controlling said distance calculating means and said selecting means to specify another stage consecutively towards said leaf stage from a stage nearest to said root stage in said at least one intermediate stage with said specified nodes given first by said daughter nodes of said root node and subsequently by said daughter nodes of each of said at least one selected node, to select another node from said intermediate nodes, and for calculating pattern distances between said input pattern and said reference patterns with each pattern distance calculated by using said vector distances along a path from each of said at least one node selected by said selecting means with said root node used as said mother node and along branches branched from said path to ones of said leaf nodes when said ones of said leaf nodes are used as said daughter nodes of said at least one selected node selected ultimately in each branch from said intermediate nodes; and locating means for locating said input pattern as one of said reference patterns for which a shortest one of said pattern distances is calculated, wherein said at least one intermediate stage comprises a first plurality of intermediate stages, wherein said reference pattern memory means comprises:
frame vector tree memory means for storing said tree structure;
clustering vector memory means preliminarily loaded with said set as clustering vectors;
cluster vector calculating means for clustering said clustering vectors into a second plurality of cluster groups with clusters of said cluster groups represented by said cluster vectors, respectively, said second plurality being equal to said first plurality plus one; and control means for making in said frame vector tree memory means in which the intermediate nodes of said intermediate stages and said leaf nodes represent said cluster vectors with said cluster groups successively assigned to said intermediate stages except for one of said intermediate stages that is nearest to said root stage.

3. A pattern recognition device for locating an input pattern among a plurality of reference patterns represented by a set of element distributions of continuous mixture density hidden Markov models, comprising:

an input pattern buffer for receiving a time sequence of input pattern feature vectors representative of said input pattern;

reference pattern memory means for storing said element distributions in a tree structure including a root node which is located on a root stage and which represents said set of element distribution, a plurality of leaf nodes each representing a corresponding one of said element distributions and located on a leaf stage farthest from said root stage, and a plurality of intermediate nodes representing subsets of said set of element distributions and located on at least one intermediate stage between said root stage and said leaf stage, with said subsets of element distributions and the element distributions represented by said leaf nodes being denoted as cluster distributions, wherein cluster distributions are associated with each node except said root node and include element distributions corresponding to all leaf nodes descending from a non-leaf node;

means for specifying a single specified stage, said single specified stage containing daughter nodes of a mother node, said mother node being located on a stage closer to said root stage than said single specified stage;

likelihood calculating means for calculating likelihoods between each input pattern feature vector and said cluster distributions by nodes specified among said intermediate nodes and said leaf nodes on said single specified stage, said single specified stage being one of said leaf stage and said at least one intermediate stage;

selecting means for selecting at least one node among said daughter nodes of said mother node, said at least one selected node representing ones of said cluster distributions for which a greatest one of said likelihoods is calculated, said daughter nodes being located on a stage next farther from said root stage than a stage on which said mother node is located;

pattern likelihood calculating means for controlling said likelihood calculating means and said selecting means to specify another stage consecutively towards said leaf stage from a stage nearest to said root stage in said at least one intermediate stage with said specified nodes given first by said daughter nodes of said root node and subsequently by said daughter nodes of each of said at least one selected node, and to select another node from said intermediate nodes, and for calculating pattern likelihoods between said input pattern and said reference patterns with each pattern likelihood calculated by using said likelihoods alone a path from each of said at least one selected node selected by said selecting means with said root node used as said mother node and along branches branched from said path of ones of said leaf nodes when said ones of leaf nodes are used as said daughter nodes of said at least one selected node selected ultimately in each branch from said intermediate nodes; and locating means for locating said input pattern as one of said reference patterns for which a greatest one of said pattern likelihoods is calculated, wherein said pattern likelihood calculating means comprises:

frame likelihood calculating means for controlling said likelihood calculating means and said selecting means to specify said specified stage consecutively towards said leaf stage from the stage nearest to said root stage in said at least one intermediate stage with said specified nodes given first by said daughter nodes of said root node and subsequently by said daughter nodes of each of said at least one selected node selected with said root node used as said mother node and to select said another selected node from said intermediate nodes and for calculating frame likelihoods between each input pattern feature vector and said cluster distributions with said likelihoods used along a path from each of said at least one selected node selected with said root node used as said mother node and along branches branched from said path to ones of said leaf nodes when said ones of leaf nodes are used as said daughter nodes of said at lest one selected nodes selected ultimately in each branch from said intermediate nodes; and calculating means for calculating said pattern likelihoods by using said frame likelihoods.

4. A pattern recognition device for locating an input pattern among a plurality of reference patterns represented by a set of element distributions of continuous mixture density hidden Markov models, comprising:

an input pattern buffer for receiving a time sequence of input pattern feature vectors representative of said input pattern;

reference pattern memory means for storing said element distributions in a tree structure including a root node which is located on a root stage and which represents said set of element distribution, a plurality of leaf nodes each representing a corresponding one of said element distributions and located on a leaf stage farthest from said root stage, and a plurality of intermediate nodes representing subsets of said set of element distributions and located on at least one intermediate stage between said root stage and said leaf stage, with said subsets of element distributions and the element distributions represented by said leaf nodes being denoted as cluster distributions, wherein cluster distributions are associated with each node except said root node and include element distributions corresponding to all leaf nodes descending from a non-leaf node;

means for specifying a single specified stage, said single specified stage containing daughter nodes of a mother node, said mother node being located on a stage closer to said root stage than said single specified stage;

likelihood calculating means for calculating likelihoods between each input pattern feature vector and said cluster distributions by nodes specified among said intermediate nodes and said leaf nodes on said single specified stage, said single specified stage being one of said leaf stage and said at least one intermediate stage;

selecting means for selecting at least one node among said daughter nodes of said mother node, said at least one selected node representing ones of said cluster distributions for which a greatest one of said likelihoods is calculated, said daughter nodes being located on a stage next farther from said root stage than a stage on which said mother node is located;

pattern likelihood calculating means for controlling said likelihood calculating means and said selecting means to specify another stage consecutively towards said leaf stage from a stage nearest to said root stage in said at least one intermediate stage with said specified nodes given first by said daughter nodes of said root node and subsequently by said daughter nodes of each of said at least one selected node, and to select another node from said intermediate nodes, and for calculating pattern likelihoods between said input pattern and said reference patterns with each pattern likelihood calculated by using said likelihoods along a path from each of said at least one selected node selected by said selecting means with said root node used as said mother node and along branches branched from said path of ones of said leaf nodes when said ones of leaf nodes are used as said daughter nodes of said at least one selected node selected ultimately in each branch from said intermediate nodes; and locating means for locating said input pattern as one of said reference patterns for which a greatest one of said pattern likelihoods is calculated, wherein said at least one intermediate stage comprises a first plurality of intermediate stages, wherein said reference pattern memory means comprises:

frame distribution tree memory means for storing said tree structure;

clustering distribution memory means preliminarily loaded with said set as clustering distributions;

cluster distribution calculating means for clustering said clustering distributions into a second plurality of cluster groups with clusters of said cluster groups represented by said cluster distributions, respectively, said second plurality being equal to said first plurality less one; and control means for making in said frame distribution tree memory means in which the intermediate nodes of said intermediate stages and said leaf nodes represent said cluster distributions with said cluster groups successively assigned to said intermediate stages except for one of said intermediate stages that is nearest to said root stage.

* * * * *